United States Patent [19]

Lin

[11] Patent Number: 4,947,299
[45] Date of Patent: Aug. 7, 1990

[54] HOLOGRAPHIC DECORATIVE LAMP

[76] Inventor: Ming-Hung Lin, No. 2, Lane 429, Fu-chin Street, Taipei 10583, Taiwan

[21] Appl. No.: 459,632

[22] Filed: Jan. 2, 1990

[51] Int. Cl.$^5$ .......................... F21L 19/00; G02B 5/32
[52] U.S. Cl. ..................................... 362/161; 362/447; 362/810; 362/360; 350/3.7
[58] Field of Search .............. 362/806, 253, 392, 810, 362/161, 455, 351, 360, 447, 266; 350/3.6, 3.63, 3.66, 3.69, 3.7, 3.75, 3.77, 3.79; D26/11, 104, 110, 120, 128

[56] References Cited

U.S. PATENT DOCUMENTS

| | | | |
|---|---|---|---|
| D. 214,684 | 7/1969 | Roche | D26/104 |
| 128,586 | 7/1872 | Brueck | 362/161 |
| 1,335,640 | 3/1920 | Beales | 362/360 |
| 3,880,497 | 4/1975 | Bryngdahl | 350/3.6 |
| 3,947,085 | 3/1976 | Mottier | 350/3.69 |
| 4,135,251 | 1/1979 | Ruell | 356/3.79 |
| 4,904,033 | 2/1990 | Ikeda et al. | 350/3.69 |

*Primary Examiner*—Ira S. Lazarus
*Assistant Examiner*—D. M. Cox

[57] ABSTRACT

A holographic decorative lamp includes a holographic film pre-recorded with many interference patterns of a torch formed on a shade of the lamp, whereby upon an illumination of the lamp, plural three-dimensional to superimposed images of the torch can be observed through the holographic film for decorative purpose and the lamp itself may also provide illuminating effect.

5 Claims, 2 Drawing Sheets

HOLOGRAPHIC DECORATIVE LAMP

BACKGROUND OF THE INVENTION

A conventional lamp is generally served for illuminating purpose. Several conventional display devices disclosed the using of a plurality of optical fibres bunched together at one end, at which a light source is illuminated for decorative purpose. Such an optical-fiber display device is difficultly made since it requires much labor, causing an increase of its production cost. Meanwhile, the display device with optical fibers can not provide a bright illuminating effect and is merely served for single decorative use.

The present inventor has found the drawbacks of conventional lamp or optical-fiber display device, and invented the present holographic decorative lamp.

SUMMARY OF THE INVENTION

The object of the present invention is to provide a holographic decorative lamp including a holographic film pre-recorded with many interference patterns of a torch formed on a shade of the lamp, whereby upon a illumination of the lamp, plural three-dimensional or superimposed images of the torch can be observed through the holographic film for decorative purpose and the lamp itself may also provide illuminating effect.

DETAILED DESCRIPTION

Figure 1:
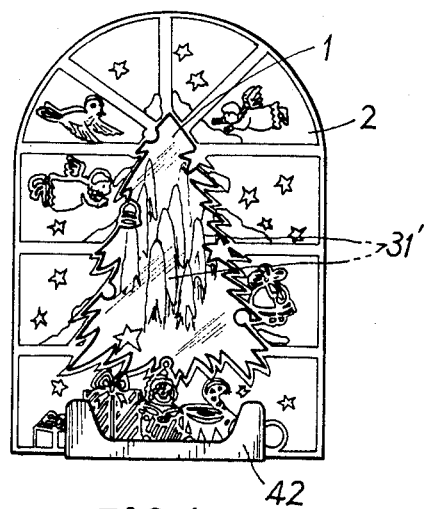
FIG. 1 is a front view of the present invention.
Figure 2:
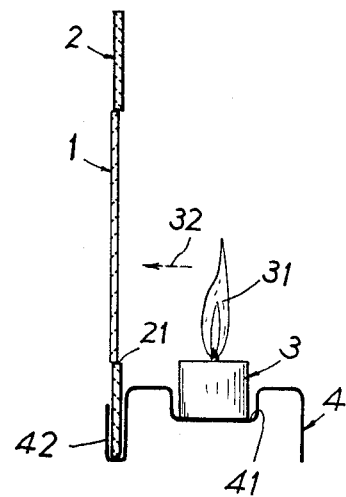
FIG. 2 is a side view of the present invention.

An shown in FIGS. 1 and 2, the present invention comprises: a holographic film 1 embedded on a shade 2, an illuminator 3 which may be a candle made of wax and burned for producing a torch 31, and a base 4 for holding and supporting the illuminator 3.

Figure 5:
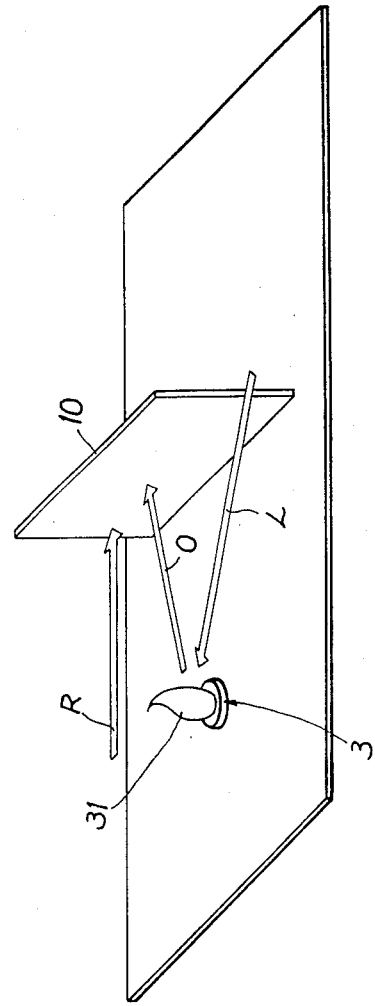
FIG. 5 shows the making of the holographic recording plate of the present invention.
Figure 6:
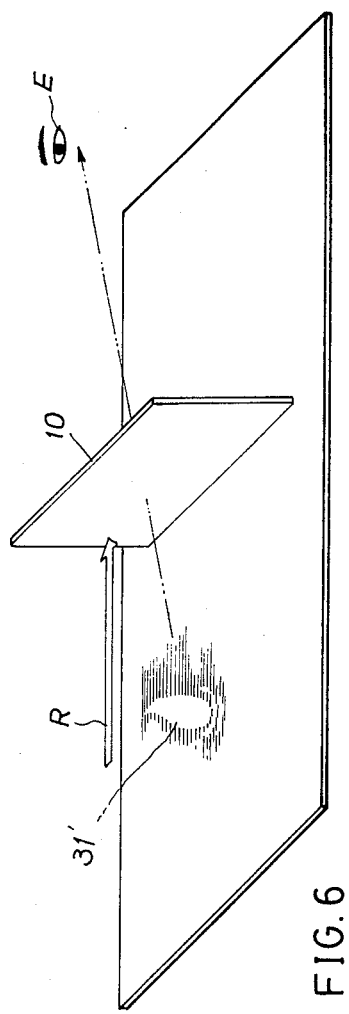
FIG. 6 shows a reconstruction of the torch image for the present invention.

The holographic film 1 of the present invention can be reproduced or copied from a holographic recording plate 10 as made by the steps as illustrated in FIGS. 5 and 6, in which a laser beam is split into two beams of which one reference beam R is directly aimed at a photographic recording plate 10 and the other object beam 0 is aimed at a torch 31 of the illuminator 3 which may be a candle as shown in FIG. 2 and then reflected to project towards the recording plate 10, thereby making interference patterns of a hologram of the torch 31 on the plate 10.

When the processed plate 10 is illuminated by aiming the reconstruction beam which may be the original reference beam R, a hologram image 31' can be observed through the plate 10 by an observer's eye E as shown in FIG. 6. In processing the recording plate 10, the directions of the reference beam relative to the plate 10 may be changed between exposures so as to form plural superimposed interference patterns of the lamp torch 31. By changing the angles of illumination, plurality of torch images may be reconstructed so that the finished holographic recording plate 10 may provide a plurality of images 31' of the torch 31 of illuminator 3. The recording plate 10 may be reproduced or copied to form a holographic film 1 to be used in this invention.

The holographic film 1 may be formed on the shade 2 by embedding the film 1 in a window 21 of the shade 2 or coating the film 1 on a transparent shade 2, or by other fixing methods.

The base 4 as shown in FIG. 2 is formed a socket 41 for fixing the illuminator 3 of candle therein and a bracket 42 for inserting the shade 2 having a film 1 fixed thereon in the bracket 42 of the base 4.

Figure 3:
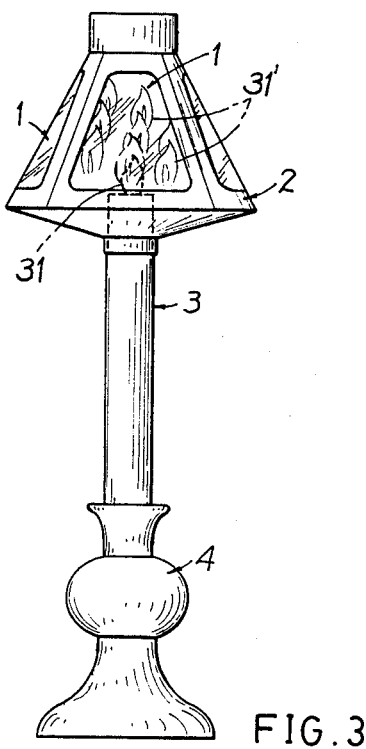
FIG. 3 shows another preferred embodiment of the present invention.
Figure 4:
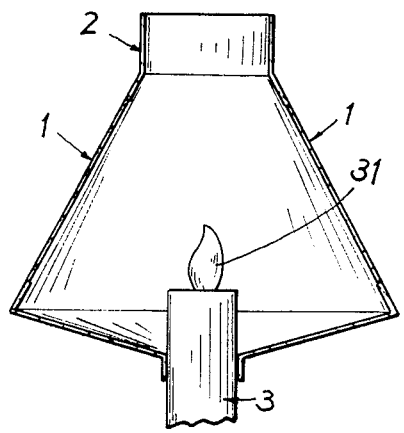
FIG. 4 is a partial sectional drawing of the present invention as shown in FIG. 3.

Another preferred embodiment of the present invention is shown in FIGS. 3 and 4, wherein the illuminator of candle 3 as shown in FIG. 2 has been replaced by an electric light 3 shaped like a candle having a bulb 31 formed on its top portion to imitate the torch 31 of the candle illuminator 3 as shown in FIG. 2. The shade 2 is formed a cone shape surrounding the bulb 31 of the illuminator 3. A plurality of holographic films 1 may be formed on the shade 2 as shown in FIG. 4. The illuminator 3 shaped as a candle is held on a base 4 as shown in FIG. 3. The lamp as shown in FIG. 3 may be powered by a battery (not shown) stored in the base or by a power source of AC current.

The lamp of the present invention can be modified or changed in shapes, forms, materials or arrangemants of all elements in construction of the lamp and is not limited in this invention without departing from the claiming scope as claimed in the appended claims.

The present invention has the following advantages superior to the conventional lamps or optical display devices:

1. The torch or bulb 31 of the illuminator 3 may serve for illuminating the surrounding and also for producing a plurality of torch images 31' for decorative purpose.
2. The holographic film 1 is directly formed in situ in the shade 2 for producing a plurality of images of multiple superimposed views or three-dimentional view, without requiring any additional complex decorating mechanism for reducing production cost and minimizing maintenance problems of the lamp.
3. The lamp can be either a candle made of wax without the need of electric source or an electric light such as powered by a battery of alternative choices.

What is claimed:
1. A holographic decorative lamp comprising:
   an illuminator having a torch formed on a top portion of the illuminator;
   a base for holding and supporting said illuminator thereon;
   a shade shielding said torch of said illuminator having a transparent portion or an opening formed in the shade for transmitting light therethrough; and
   at least a holographic film pre-recorded with a plurality of holograms of said torch of said illuminator, said holographic film embedded in said opening of said shade or coated on said transparent portion of said shade, whereby upon an illumination of said torch, a plurality of images of said torch will be viewed through said holographic film for decorative and illumination purposes.

2. A holographic decorative lamp according to claim 1, wherein said illuminator is a candle made of wax and said torch is formed by burning said candle.

3. A holographic decorative lamp according to claim 1, wherein said illuminator is an electric light having a bulb formed on a top portion of the electric light to serve as said torch of said illuminator, said bulb being illuminated by a power source.

4. A holographic decorative lamp according to claim 1, wherein said shade is formed with said holographic film thereon, said shade being mounted on a bracket of said base and positioned beyond said torch of said illuminator.

5. A holographic decorative lamp according to claim 1, wherein said shade is formed as a cone shape embedded with a plurality of said holographic films on said shade, said shade surrounding said torch of said illuminator.

* * * * *